T. M. WHITLOCK.
WAGON SCALE.
APPLICATION FILED NOV. 6, 1914.
1,172,185.
Patented Feb. 15, 1916.
2 SHEETS—SHEET 1.
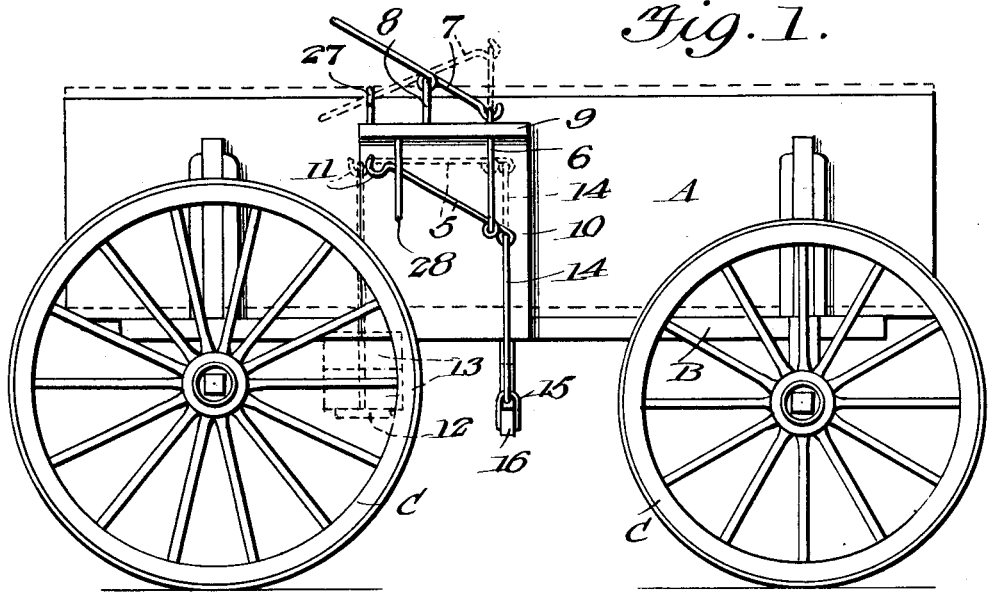
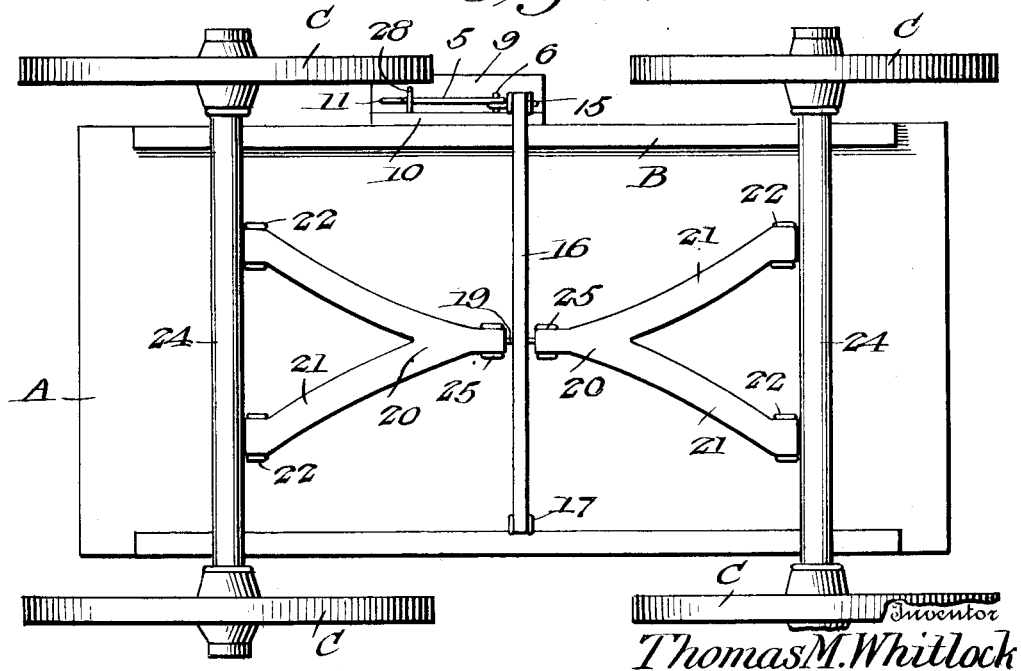
Witnesses
Inventor
Thomas M. Whitlock
By Victor J. Evans
Attorney

T. M. WHITLOCK.
WAGON SCALE.
APPLICATION FILED NOV. 6, 1914.

1,172,185.

Patented Feb. 15, 1916.
2 SHEETS—SHEET 2.

Inventor
Thomas M. Whitlock

Witnesses

By Victor J. Evans
Attorney

UNITED STATES PATENT OFFICE.

THOMAS M. WHITLOCK, OF OAKWOOD, MISSOURI, ASSIGNOR OF ONE-HALF TO JAMES FRED HARRIS, OF HANNIBAL, MISSOURI.

WAGON-SCALE.

1,172,185.     Specification of Letters Patent.     Patented Feb. 15, 1916.

Application filed November 6, 1914. Serial No. 870,665.

*To all whom it may concern:*

Be it known that I, THOMAS M. WHITLOCK, a citizen of the United States, residing at Oakwood, in the county of Marion and State of Missouri, have invented new and useful Improvements in Wagon-Scales, of which the following is a specification.

The invention relates to weighing scales, and more particularly to the class of wagon scales.

The primary object of the invention is the provision of wagon scales wherein on the loading of the wagon the contents can be conveniently weighed, thereby avoiding the necessity of weighing the entire wagon for determining the weight of the load as is usual.

Another object of the invention is the provision of wagon scales wherein the same are of novel form and are carried by the wagon so as to be handy for the weighing of the load on the wagon, the scales being of novel form and are also mounted in a unique manner on the wagon.

A further object of the invention is the provision of a wagon scale wherein the scales can be moved into operative or inoperative position as the occasion may require, and when in operative position will enable the weighing of the load in the wagon box without the removal of the box from the wagon gear or the weighing of the entire wagon as is usual.

A still further object of the invention is the provision of a wagon scale which is simple and of an improved construction to render the same strong, convenient for operation, and also one which is inexpensive in manufacture.

With these and other objects in view, the invention consists in the construction, combination and arrangement of parts as will be hereinafter fully described, illustrated in the accompanying drawings, and pointed out in the claims hereunto appended.

Figure 2:
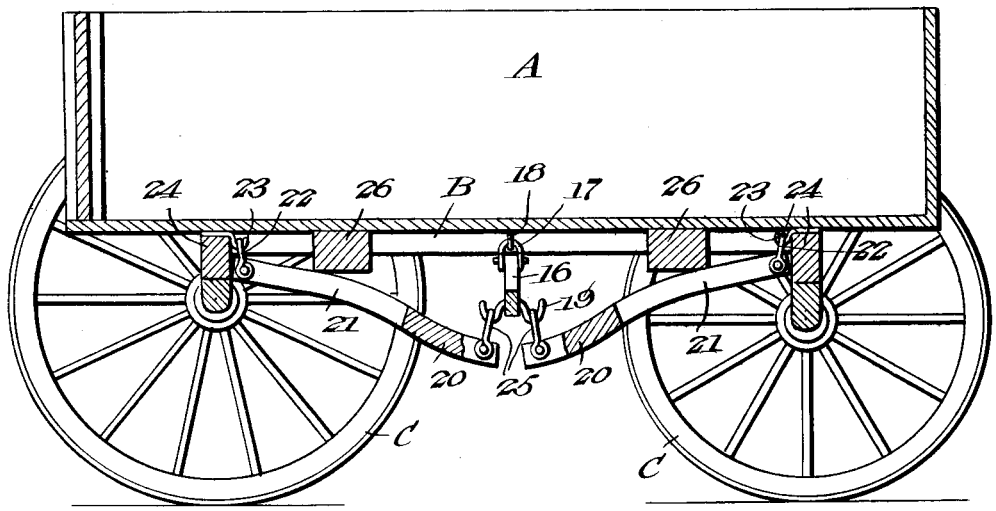
Figure 3:
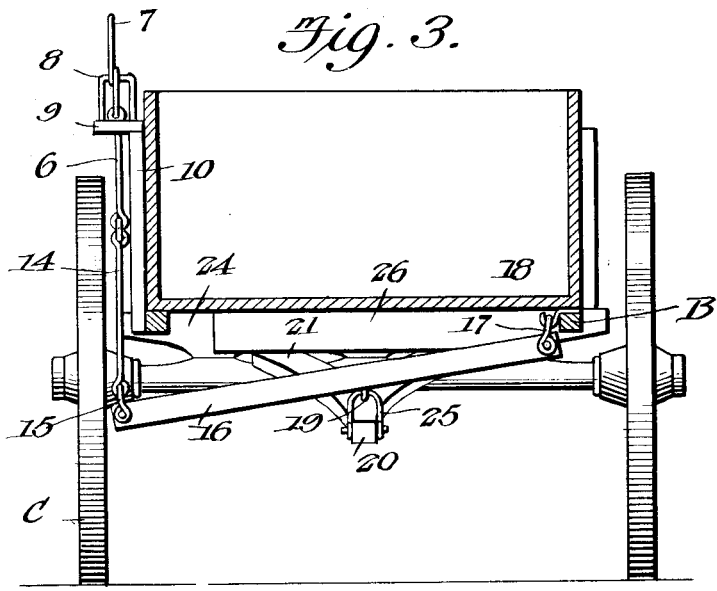

In the drawings:—Figure 1 is a side elevation of a wagon showing the application of the wagon scales constructed in accordance with the invention. Fig. 2 is a vertical longitudinal sectional view through the wagon. Fig. 3 is a vertical transverse sectional view. Fig. 4 is a bottom plan view.

Similar reference characters indicate corresponding parts throughout the several views in the drawings.

Referring to the drawings in detail, A designates the wagon body or box, B the bed, and C the wheels of the running gear, constituting the wagon in its entirety, of the ordinary well-known construction. The body or box A rests upon the bed B, in the usual well-known manner.

The wagon scales comprise a scale beam 5, which is fulcrumed upon an adjustable hanger 6 connected to and loosely suspended from a rocking lever 7 swingingly supported in a bearing 8 rising from a shelf 9 forming the head of a scale stand 10, which is fixed to one of the side rails of the bed B and rises vertically therefrom at one side of the wagon body or box A, the beam 8 being formed at one end with a hook 11 to which is connected a weight support or hanger 12 for the usual removable weights 13, which when not in use are adapted to be placed upon the shelf or head on the stand 10 so that the scale will be rendered inactive, and when in this position the lever 7 is in raised position. Connected to the opposite end of the scale beam 5 is a chain or link rod 14 which is also connected to a clip 15 mounted in one end of a balancing lever 16 which is arranged transversely beneath the bed B and has pivotally connected to its opposite end a loop 17, the latter being engaged in an eye member 18 fixed in the other longitudinal rail of the bed B, the lever 16 being provided intermediate its ends with hooks 19 disposed opposite each other on opposed sides of the said lever for connection with balancing members hereinafter fully described.

The balancing members each comprises a fork 20 arranged beneath each end of the wagon body or box A, and the limbs 21 of the respective forks 20 have pivotally connected thereto loops 22 which engage hook members 23 mounted in the end bolsters 24 of the bed B, while the opposite ends of the forks have pivoted thereto the loops 25 which engage the hooks 19 on the lever 16, the wagon body or box A being provided with bearing blocks 26 which are fixed to the outer face of the bottom thereof near opposite ends of the same to rest upon the forks 20 forming the balancing members, so that on adjustment of the scale for operation the body or box A, which normally rests upon the bed B, is elevated from the latter by the raising of the forks 20, so that the said body or box A will be supported by the bearing blocks 26 directly upon the balancing members formed by the forks 20 of the scale, whereby the contents of the body or box A can be weighed.

Mounted in the shelf 9 forming the head of the stand 10 is a hook-like keeper 27 in which is engaged the lever 7 when lowered for the adjustment of the scale to operative position so as to hold the scale in such position for the weighing of the contents of the body or box A of the wagon.

Fixed to the stand 10 and bridging the scale beam 5 is a guide bail 28 which limits the swinging of the scale beam 5 and guides the same in its rocking movement when the scale is inactive for the weighing of the contents of the body or box A of the wagon.

Normally the scale is inactive, and this is effected by disengaging the lever 7 from the keeper 27, whence the weight of the wagon body or box A on the balancing members of the scale will cause the lowering of said members and the lever 16 so that the body or box A is permitted to rest upon the bed B of the wagon, and when in this position the scale beam is in inactive position. To bring the scales into action it is necessary to lower the lever 7 and engage it in the keeper 27 so that the scale beam is suspended from the hanger 6, and is in a position so that the weight of the load in the body or box A will be directly on the balancing members formed by the forks 20 which, through the lever 16 and the link or rod 14, are connected to the scale beam 5, so that on the placing of the weights 13 upon the hanger 12 carried by the scale beam 5, the weight of the contents of the body of the box A can be accurately determined on the balancing of the scale beam.

It is of course to be understood that the scales can be applied to railway cars, motor or power driven vehicles, or the like, used for hauling any kind of material to be weighed. Therefore, the invention is not restricted to the use hereinbefore set forth.

From the foregoing description, taken in connection with the accompanying drawings, the construction and manner of operation of the device will be clearly understood, and therefore a more extended explanation has been omitted.

What is claimed is:—

1. The combination with a vehicle running gear and body, of fulcrum beams fixed transversely to the body in spaced relation to each other, a lever arranged between the fulcrum beams and swingingly suspended from the bottom of the body, a pair of fork-like levers adapted to work against the fulcrum beams, loop members pivotally connected to the ends of the levers, hooks on opposite sides of the first-named lever and detachably engaged by the loop members on the ends of the second named levers adjacent thereto, hook members carried by the bolsters of the running gear and detachably engaged by the loop members on the ends adjacent thereto of the second named levers, and weighing mechanism supported by the running gear and having connection with the first-named lever.

2. The combination with a vehicle running gear and body, of fulcrum beams fixed transversely to the body in spaced relation to each other, a lever arranged between the fulcrum beams and swingingly suspended from the bottom of the body, a pair of fork-like levers adapted to work against the fulcrum beams, loop members pivotally connected to the ends of the levers, hooks on opposite sides of the first-named lever and detachably engaged by the loop members on the ends of the second named levers adjacent thereto, hook members carried by the bolsters of the running gear and detachably engaged by the loop members on the ends adjacent thereto of the second-named levers, weighing mechanism supported by the running gear and having connection with the first-named lever, and means for moving the weighing mechanism into operative or inoperative position.

In testimony whereof I affix my signature in presence of two witnesses.

THOMAS M. WHITLOCK.

Witnesses:
N. L. LE BLOND,
J. F. HARRIS.